United States Patent
Takamatsu (10) Patent No.: US 11,158,893 B2
(45) Date of Patent: Oct. 26, 2021

(54) BATTERY HEATING DEVICE (71) Applicant: TOYOTA JIDOSHA KABUSHIKI KAISHA, Toyota (JP)

(72) Inventor: Naoyoshi Takamatsu, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/661,543

(22) Filed: Oct. 23, 2019

(65) Prior Publication Data
US 2020/0144684 A1  May 7, 2020

(30) Foreign Application Priority Data

Nov. 2, 2018 (JP) .............................. JP2018-207668

(51) Int. Cl.
| *H01M 10/63* | (2014.01) |
| *H01M 10/615* | (2014.01) |
| *H01M 10/48* | (2006.01) |
| *H01M 10/625* | (2014.01) |
| H02P 5/74 | (2006.01) |
| H02M 3/158 | (2006.01) |
| B60L 58/27 | (2019.01) |

(52) U.S. Cl.
CPC ......... *H01M 10/63* (2015.04); *H01M 10/486* (2013.01); *H01M 10/615* (2015.04); *H01M 10/625* (2015.04); *B60L 58/27* (2019.02); *H02M 3/1588* (2013.01); *H02P 5/74* (2013.01)

(58) Field of Classification Search
CPC ...... H01M 10/63; H01M 10/615; B60L 58/27
See application file for complete search history.

(56) References Cited

U.S. PATENT DOCUMENTS

| 8,639,405 B2 * | 1/2014 | Yamada | B60L 15/02 |
| | | | 701/22 |
| 8,884,564 B2 * | 11/2014 | Itoh | B60L 15/20 |
| | | | 318/400.3 |
| 2006/0055349 A1 * | 3/2006 | Nakayama | H02M 3/1582 |
| | | | 318/400.18 |

(Continued)

FOREIGN PATENT DOCUMENTS

| JP | 2012-210138 A | 10/2012 |
| JP | 2015-149853 A | 8/2015 |
| JP | 2017-112664 A | 6/2017 |

*Primary Examiner* — Hal Kaplan
*Assistant Examiner* — Joseph N Inge
(74) *Attorney, Agent, or Firm* — Sughrue Mion, PLLC (57) ABSTRACT

A battery heating device includes: a capacitor connected in parallel between a battery and a load; a reactor connected to the capacitor; a first switch connected to a terminal on the load side of the reactor, and to one terminal of the capacitor; a second switch connected to a terminal on the load side of the reactor, and to another terminal of the capacitor; a controller configured to control an ON/OFF state of the first switch and the second switch; and a current sensor configured to detect a direction and a current value of a reactor current flowing in the reactor. The controller performs battery heating mode control including a first control of turning OFF the first switch and turning ON the second switch when a current value becomes substantially zero from a state where the reactor current flows from the load side to the battery side.

6 Claims, 6 Drawing Sheets

(56) References Cited

U.S. PATENT DOCUMENTS

| | | | | |
|---|---|---|---|---|
| 2006/0114702 | A1* | 6/2006 | Yamada | B60L 50/16 |
| | | | | 363/132 |
| 2007/0175429 | A1* | 8/2007 | Yanagida | B60L 58/27 |
| | | | | 123/179.14 |
| 2008/0143281 | A1* | 6/2008 | Yaguchi | H01M 10/425 |
| | | | | 318/139 |
| 2009/0021198 | A1* | 1/2009 | Okamura | H02P 27/06 |
| | | | | 318/400.3 |
| 2010/0270976 | A1* | 10/2010 | Tamura | H01M 10/6563 |
| | | | | 320/136 |
| 2011/0298427 | A1* | 12/2011 | Uemura | B60L 50/51 |
| | | | | 320/134 |
| 2012/0049774 | A1* | 3/2012 | Takamatsu | B60L 15/2045 |
| | | | | 318/400.3 |
| 2012/0099618 | A1* | 4/2012 | Nishi | G01K 13/10 |
| | | | | 374/152 |
| 2012/0112695 | A1* | 5/2012 | Nishi | B60L 58/34 |
| | | | | 320/109 |
| 2017/0166069 | A1 | 6/2017 | Jojima | |
| 2019/0123656 | A1* | 4/2019 | Sone | H02M 1/36 |

\* cited by examiner

BATTERY HEATING DEVICE

The present application claims priority to and incorporates by reference the entire contents of Japanese Patent Application No. 2018-207668 filed in Japan on Nov. 2, 2018.

BACKGROUND

The present disclosure relates to a battery heating device.

There has been disclosed a technique for raising a temperature of a battery in a voltage converter using a switching element by utilizing a current ripple generated with a switching operation of the switching element (for example, JP 2012-210138 A). In the technique of JP 2012-210138 A, when a battery temperature is lower than a predetermined threshold temperature with respect to a switching element of two voltage converters, a drive signal having a same waveform and a smaller phase difference as compared to a case where the battery temperature is higher than the threshold temperature is supplied.

However, in the technique of JP 2012-210138 A, an amplitude of the generated current ripple is constant and limited, and there is room for improvement in the effect of raising a temperature of the battery.

There is a need for a battery heating device that may raise a temperature effectively.

SUMMARY

According to one aspect of the present disclosure, there is provided a battery heating device including: a capacitor connected in parallel between a battery and a load that is electrical; a reactor connected to the capacitor, the reactor being connected closer to the battery than the capacitor between the battery and the load; a first switch connected to a terminal on the load side of the reactor, and to one terminal of the capacitor; a second switch connected to a terminal on the load side of the reactor, and to another terminal of the capacitor; a controller configured to control an ON/OFF state of the first switch and the second switch; and a current sensor configured to detect a direction and a current value of a reactor current flowing in the reactor, wherein when the controller determines that a battery heating mode control execution condition is satisfied including a condition on a parameter related to a temperature of the battery, in a state where the first switch is in an ON state and the second switch is in an OFF state, and a voltage of the battery is larger than a voltage across two terminals of the capacitor after the capacitor switches from a charging state to a discharging state, the controller is configured to perform battery heating mode control including a first control of turning OFF the first switch and turning ON the second switch when a current value becomes substantially zero from a state where a direction of the reactor current is a direction of flowing from the load side to the battery side.

The above and other objects, features, advantages and technical and industrial significance of this disclosure will be better understood by reading the following detailed description of an exemplary embodiment of the disclosure, when considered in connection with the accompanying drawings.

DETAILED DESCRIPTION

Hereinafter, a power supply device according to an exemplary embodiment will be specifically described with reference to the drawings. While the power supply device according to the exemplary embodiment may be suitably used as a power supply of a vehicle powered by electric power, such as a hybrid vehicle, a plug-in hybrid vehicle, or an electric vehicle (EV), a case of being mounted on a hybrid vehicle will be mainly described below.

Figure 1:
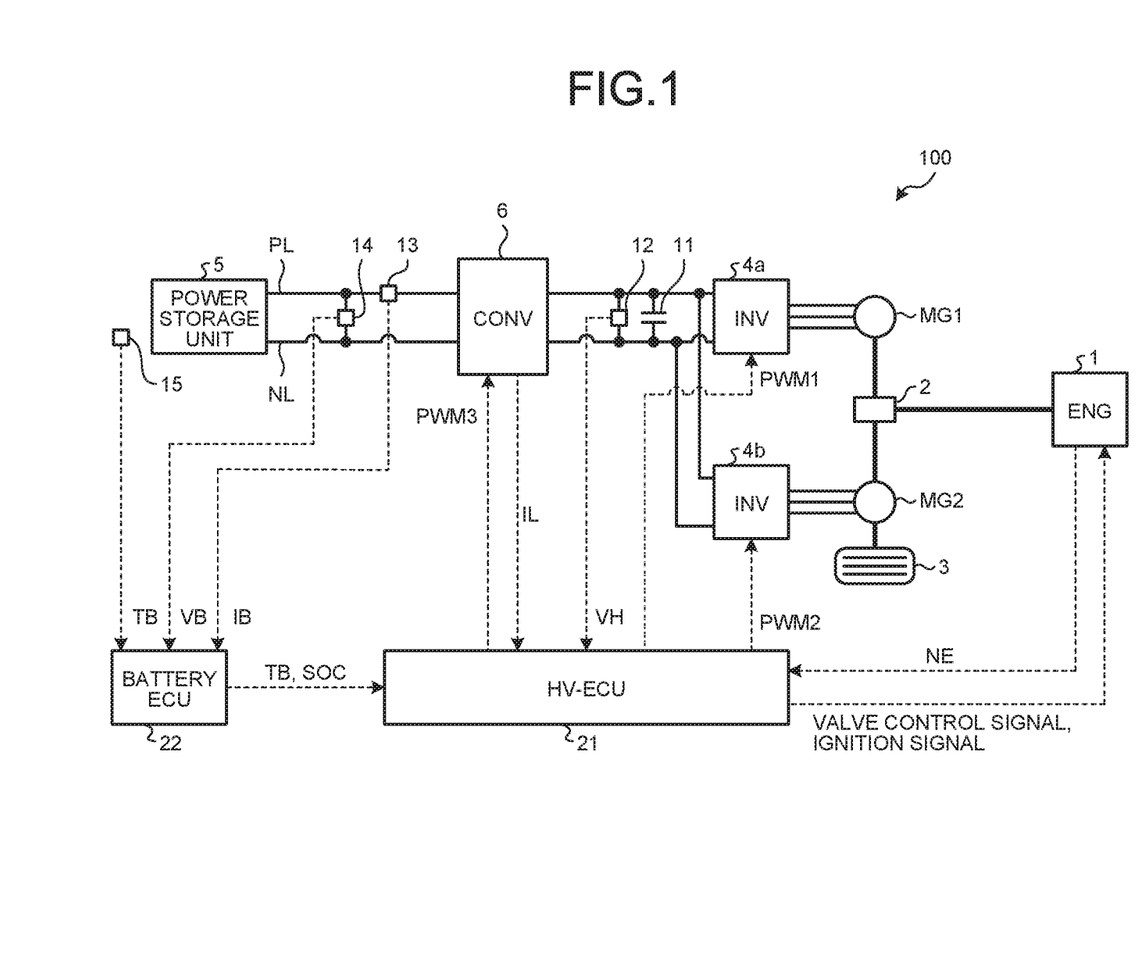
FIG. 1 is a schematic configuration diagram of an example of a vehicle equipped with a battery heating device according to an exemplary embodiment.

FIG. 1 is a schematic configuration diagram of an example of a vehicle equipped with a battery heating device according to the exemplary embodiment. Hereinafter, the battery heating device may simply be described as a heating device.

A vehicle 100 is a hybrid vehicle that may travel in a hybrid travel mode or an EV travel mode. The vehicle 100 includes at least an engine (ENG) 1 that is an internal combustion engine, a power split mechanism 2, a drive wheel 3, motor generators MG1 and MG2, inverters (INVs) 4a and 4b, a power storage unit 5, a voltage converter 6, a capacitor 11, voltage sensors 12 and 14, a current sensor 13, a temperature sensor 15, a hybrid (HV)-electronic control unit (ECU) 21, and a battery ECU 22.

The engine 1 is a known engine such as a gasoline engine or a diesel engine. The motor generators MG1 and MG2 have functions of both a motor and a generator. The power split mechanism 2 is formed of, for example, a planetary gear mechanism including three elements of a sun gear, a planetary carrier, and a ring gear. The engine 1 and the motor generators MG1 and MG2 each are connected to any of the three elements.

When the vehicle 100 travels, for example, the power split mechanism 2 splits a driving force outputted by the engine 1 into two, distributes one of the two to the motor generator MG1 side, and distributes the other to the motor generator MG2 side. The driving force distributed to the motor generator MG1 side is used for power generation of the motor generator MG1. The driving force distributed to the motor generator MG2 is combined with a driving force outputted from the motor generator MG2, and is outputted to the drive wheel 3.

The inverters 4a and 4b have a function of mutually converting DC power and AC power, and are connected to the power storage unit 5 via a positive line PL and a negative line NL. The inverter 4a converts, for example, AC power generated by the motor generator MG1 into DC power, and supplies the DC power to the power storage unit 5. The inverter 4b converts, for example, DC power supplied from the power storage unit 5 into AC power, and supplies the AC power to the motor generator MG2 to generate a driving force. In this case, the motor generator MG2 and the inverter 4b are electrical loads on the power storage unit 5.

The power storage unit 5 includes a battery, and discharges power to the inverters 4a and 4b side via the positive line PL and the negative line NL, or charges power supplied from the inverters 4a and 4b side.

The voltage converter 6 is provided between the power storage unit 5 and the inverters 4a and 4b, and is connected to the positive line PL and the negative line NL. The voltage converter 6 functions as a boost converter that boosts a voltage of power discharged from the power storage unit 5 to the inverters 4a and 4b side, and outputs the voltage to the inverters 4a and 4b. Note that the voltage converter 6 also functions as a step-down converter that steps down a voltage of power supplied from the inverters 4a and 4b side, and outputs the voltage to the power storage unit 5.

The capacitor 11 is connected to the positive line PL and the negative line NL between the power storage unit 5 and the inverters 4a and 4b, and is connected in parallel with the power storage unit 5. The capacitor 11 smoothes power flowing between the power storage unit 5 and the inverters 4a and 4b. Further, the capacitor 11 configures a booster, which will be described in detail later. The voltage sensor 12 is connected to the positive line PL and the negative line NL, detects a capacitor voltage VH that is a voltage across both terminals of the capacitor 11, and outputs a detection signal to the HV-ECU 21. The capacitor voltage VH is also an output voltage on the boosting side of the voltage converter 6.

The current sensor 13 is provided on the positive line PL, detects a current value and a current flow direction of a battery current IB, which is a current of power discharged by the power storage unit 5, and outputs a detection signal thereof to the battery ECU 22. The voltage sensor 14 is connected to the positive line PL and the negative line NL, detects a battery voltage VB, which is a voltage of the battery of the power storage unit 5, and outputs a detection signal to the battery ECU 22.

The temperature sensor 15 is an acquisition unit that is provided near the power storage unit 5, detects a battery temperature TB that is a temperature of the battery of the power storage unit 5, and outputs a detection signal to the battery ECU 22.

The HV-ECU 21 and the battery ECU 22 are configured to be able to communicate with each other by, for example, a controller area network (CAN), and may transmit and receive individual signals of various commands and detection results of various sensors. The HV-ECU 21 controls the engine 1 and the motor generators MG1 and MG2 mainly for generating a vehicle driving force according to a driver's request when the vehicle 100 travels, and controls a voltage of the battery of the power storage unit 5. The HV-ECU 21 is inputted with individual signals of a rotational speed NE of the engine 1, a rotational speed of the motor generators MG1 and MG2, a vehicle speed, an accelerator opening degree, a capacitor voltage VH, a battery temperature TB, a reactor current IL to be described later, state of charge (SOC) of the battery of the power storage unit 5, and the like. Further, the HV-ECU 21 outputs an electronic throttle valve control signal (valve control signal) and an ignition signal for the engine 1, signals PWM1 and PWM2 that are pulse width modulation (PWM) signals for controlling the inverters 4a and 4b, and a signal PWM3 that is a PWM signal for controlling an operation of the voltage converter 6, which are calculated on the basis of the inputted information.

The battery ECU 22 mainly performs management of a charging state of the battery of the power storage unit 5, abnormality detection, and voltage control. The battery ECU 22 is inputted with individual signals of the battery temperature TB, the battery voltage VB, the battery current IB, and the like. The battery ECU 22 calculates the SOC of the battery of the power storage unit 5 on the basis of the battery temperature TB, the battery voltage VB, and the battery current IB. The battery ECU 22 transmits individual signals of the battery temperature TB and the SOC to the HV-ECU 21.

Both of the HV-ECU 21 and the battery ECU 22 physically are electronic circuits mainly formed of a known microcomputer including a central processing unit (CPU), a random access memory (RAM), a read only memory (ROM), and an interface for input and output. Functions of the HV-ECU 21 and the battery ECU 22 are realized by operating a control target under control of the CPU and reading and writing data in the RAM and the ROM, by loading an application program held in the ROM into the RAM and executing by the CPU.

Figure 2:
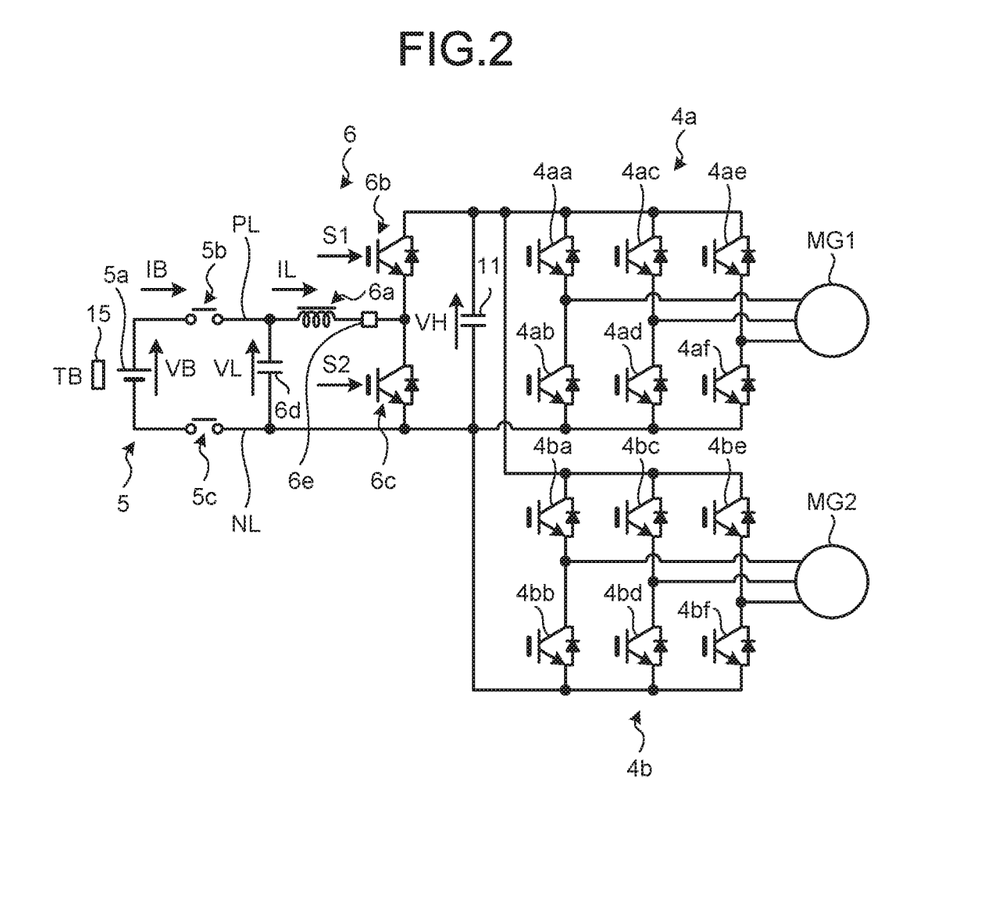
FIG. 2 is a circuit configuration diagram of a portion including a battery heating device.

FIG. 2 is a circuit diagram of a portion including a heating device. the power storage unit 5 includes a battery 5a and relay switches 5b and 5c. The battery 5a is, for example, a lithium ion battery. A positive electrode of the battery 5a is connected to the positive line PL, and a negative electrode is connected to the negative line NL.

The relay switches 5b and 5c are provided on the positive line PL and the negative line NL, respectively. Each of the relay switches 5b and 5c is opened when a main switch (not illustrated) of the vehicle 100 is turned ON, and is closed when the main switch is turned OFF. As a result, when the main switch is turned ON, the power storage unit 5 and the voltage converter 6 are electrically conducted, and the battery current IB flows. When the main switch is turned OFF, the power storage unit 5 and the voltage converter 6 are electrically disconnected. Note that the temperature sensor 15 is provided in the vicinity of the battery 5a in order to detect the battery temperature TB.

The voltage converter 6 includes a reactor 6a, a switching element 6b that is a first switching unit, a switching element 6c that is a second switching unit, and a filter capacitor 6d. The voltage converter 6 is configured as a synchronous rectification converter. Further, the voltage converter 6 is provided with a current sensor 6e.

The reactor 6a is provided on the positive line PL, and is connected to the capacitor 11.

The switching elements 6b and 6c are transistors, for example, and both are insulated gate bipolar transistors (IGBTs) in the exemplary embodiment. The switching elements 6b and 6c are individually connected with diodes in antiparallel. The switching elements 6b and 6c are connected in series such that an emitter of the switching element 6b is connected to a collector of the switching element 6c. Further, the emitter of the switching element 6b and the collector of the switching element 6c are connected to a load side terminal of the reactor 6a. A collector of the switching element 6b is connected to one terminal of the capacitor 11. An emitter of the switching element 6c is connected to the other terminal of the capacitor 11. The switching elements 6b and 6c are controlled such that signals S1 and S2 included in the signal PWM3 from the HV-ECU 21 are inputted to individual gates, and turned ON or OFF at a predetermined timing.

The filter capacitor 6d is connected to the positive line PL and the negative line NL, and is connected to the reactor 6a. The filter capacitor 6d performs charge and discharge of electrical energy in conjunction with the reactor 6a.

The current sensor 6e is provided on the positive line PL so as to be connected in series with the reactor 6a, detects a current value and a current flow direction of the reactor current IL, and outputs a detection signal to the HV-ECU 21.

The inverter 4a includes switching elements 4aa, 4ab, 4ac, 4ad, 4ae, and 0af forming upper and lower arms of individual phases (U phase, V phase, and W phase). In the U-phase upper and lower arms, the switching element 4aa as an upper arm element and the switching element 4ab as a lower arm element are connected in series. In the V-phase upper and lower arms, the switching element 4ac as an upper arm element and the switching element 4ad as a lower arm element are connected in series. In the W-phase upper and lower arms, the switching element 4ae as an upper arm element and the switching element 0af as a lower arm element are connected in series. The switching elements 4aa, 4ab, 4ac, 4ad, 4ae, and 0af are transistors, for example, and are all IGBTs and connected with diodes in antiparallel, in the exemplary embodiment. Each gate of the switching elements 4aa, 4ab, 4ac, 4ad, 4ae, and 0af is inputted with a PWM signal included in the signal PWM1, and is controlled to be turned ON or OFF at each individual timing of each element.

Similarly, the inverter 4b includes switching elements 4ba, 4bb, 4bc, 4bd, 4be, and 4bf forming upper and lower arms of each phase (U phase, V phase, and W phase). In the U-phase upper and lower arms, the switching element 4ba as an upper arm element and the switching element 4bb as a lower arm element are connected in series. In the V-phase upper and lower arms, the switching element 4bc as an upper arm element and the switching element 4bd as a lower arm element are connected in series. In the W-phase upper and lower arms, the switching element 4be as an upper arm element and the switching element 4bf as a lower arm element are connected in series. The switching elements 4ba, 4bb, 4bc, 4bd, 4be, and 4bf are transistors, for example, and are all IGBTs and connected with diodes in antiparallel, in the exemplary embodiment. Each gate of the switching elements 4ba, 4bb, 4bc, 4bd, 4be, and 4bf is inputted with a PWM signal included in the signal PWM2, and is controlled such that the individual elements are turned ON or OFF at the individual timings.

In the exemplary embodiment, the heating device is configured to include the reactor 6a, the switching elements 6b and 6c, the current sensor 6e, the capacitor 11, the temperature sensor 15, and the HV-ECU 21.

Next, control executed by the HV-ECU 21 will be described. It should be noted that, in the following description, a current value is represented as a positive value with, as a positive direction, a case where a direction of the reactor current IL as a reactor current is a flow direction from the battery 5a side to the load side, and a current value is represented by a negative value with a case of a flow direction from the load side to the battery 5a side as a negative direction.

When the HV-ECU 21 determines that a battery heating mode control execution condition is satisfied including a condition on a parameter related to the temperature of the battery 5a, the HV-ECU 21 executes the following battery heating mode control. In the exemplary embodiment, the condition on the parameter related to the temperature of the battery 5a is a condition that the battery temperature TB detected by the temperature sensor 15 is equal to or less than a predetermined value. Further, the temperature increase mode control execution condition in the exemplary embodiment includes a condition as to whether or not the driver is requesting a driving force. The HV-ECU 21 determines whether or not the driver is requesting a driving force, for example, on the basis of a signal of an accelerator opening degree. For example, when the signal of the accelerator opening degree is a signal including information that the accelerator opening degree is zero, it is determined that the driver is not requesting a driving force. Cases where the driver is not requesting a driving force include, for example, a case where the vehicle 100 is stopped. In the exemplary embodiment, when determining that the battery temperature TB is equal to or less than a predetermined value and the driver is not requesting a driving force, the HV-ECU 21 determines that the battery heating mode control execution condition is satisfied, and executes the battery heating mode control.

The battery heating mode control includes a first control and a second control. The first control is performed when the switching element 6b is in an ON state and the switching element 6c is in an OFF state, and the battery voltage VB is larger than the capacitor voltage VH of the capacitor 11 after the capacitor 11 switches from a charging state to a discharging state. Specifically, the first control is control to turn OFF the switching element 6b and turn ON the switching element 6c when the reactor current IL changes from a negative value to substantially zero.

Further, the second control is performed when the reactor current IL is a positive value, and is a control to turn ON the switching element 6b and turn OFF the switching element 6c when the reactor current IL becomes larger than a set value (hereinafter referred to as a switch-off current set value $I_{off}$.

Figure 3:
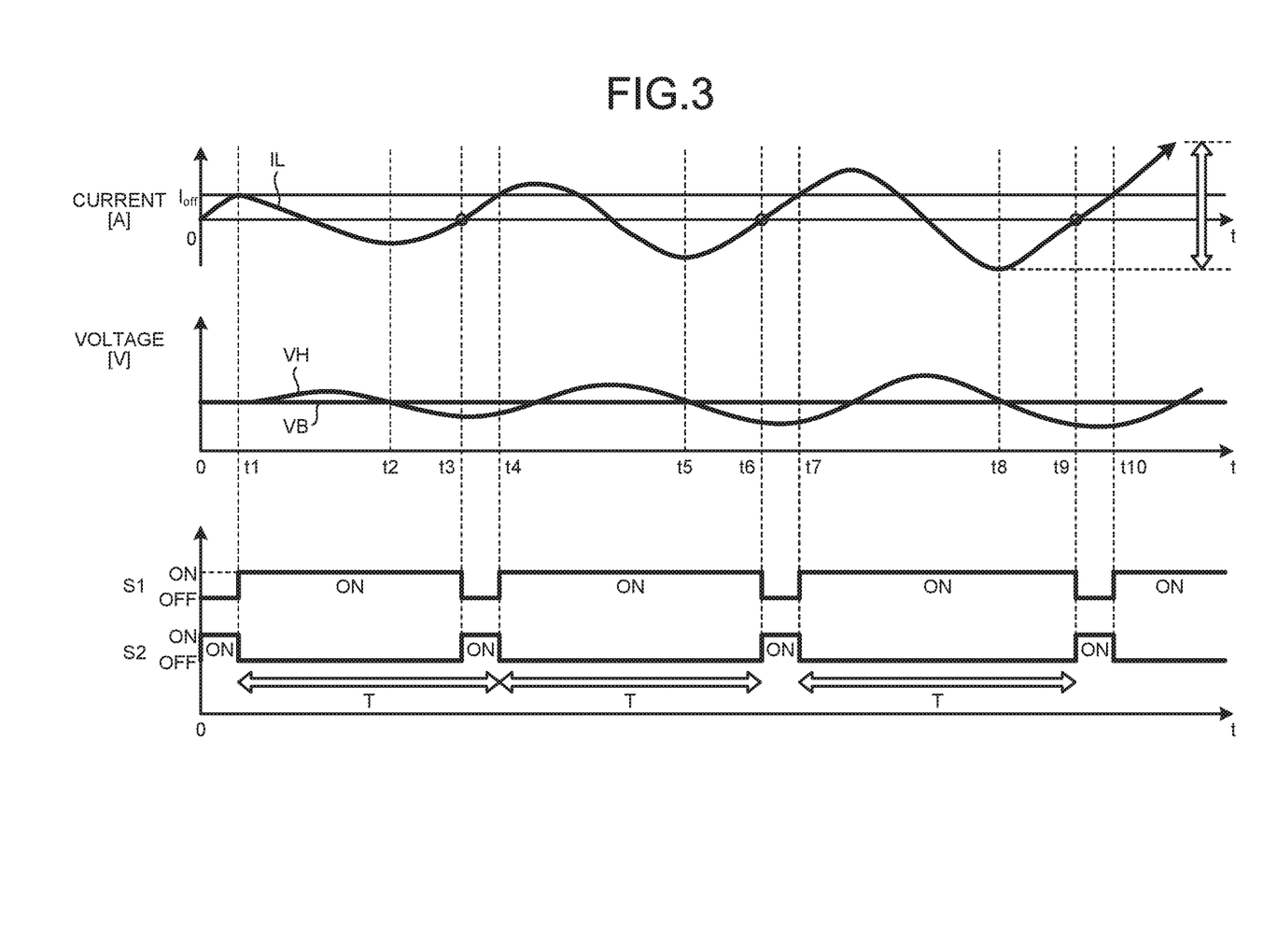
FIG. 3 is a view illustrating an example of a time chart of a reactor current, a capacitor voltage, a battery voltage, and a switch signal.

An example of the reactor current IL, the capacitor voltage VH, the battery voltage VB, and the signals S1 and S2 when the above-described battery heating mode control is performed will be described with reference to a time chart of FIG. 3.

First, it is assumed that the signals S1 and S2 are both OFF, the reactor current IL is zero, and VB=VH before a start of the battery heating mode control. The battery voltage VB is constant. Note that, for example, the signal S1 being OFF means that the signal S1 is in a state of turning OFF the switching element 6b. Further, a sign of the capacitor voltage VH is positive in a case where a terminal connected to the positive line PL of the capacitor 11 (a side to which the arrow in FIG. 2 faces) has a high potential.

Assuming that a start time of the battery heating mode control is t=0, the HV-ECU 21 turns OFF the signal S1 and turns ON the signal S2 at t=0. Thereby, the switching element 6b is turned OFF, and the switching element 6c is turned ON.

By turning OFF the switching element 6b and turning ON the switching element 6c, the reactor current IL increases with a positive value. At time t1, when the reactor current IL becomes larger than $I_{off}$, the HV-ECU 21 performs the second control of turning ON the switching element 6b and turning OFF the switching element 6c.

Thereafter, although the reactor current IL decreases, the capacitor 11 is charged to increase the capacitor voltage VH. Thereafter, when the reactor current IL becomes a negative value, the capacitor 11 is discharged and the capacitor voltage VH decreases. Thereafter, at time t2, when the capacitor voltage VH becomes smaller than the battery voltage VB, the reactor current IL takes a minimum value and starts to increase again.

After time t2, a state is established in which the switching element 6b is in the ON state, the switching element 6c is in the OFF state, the battery voltage VB is larger than the capacitor voltage VH after the capacitor 11 switches from the charging state to the discharging state. Thereafter, at time t3, when the reactor current IL changes from a negative value to substantially zero, the capacitor voltage VH is minimized with a negative value. At this time, the HV-ECU 21 performs the first control of turning OFF the switching element 6b and turning ON the switching element 6c. By performing the first control at such timing, the capacitor voltage VH is minimized after the capacitor 11 is discharged due to the effect of LC resonance, and an amplitude based on the battery voltage VB may be increased in the negative direction.

Thereafter, the reactor current IL increases with a positive value. At time t4, when the reactor current IL becomes larger than $I_{off}$, the HV-ECU 21 performs again the second control of turning ON the switching element 6b and turning OFF the switching element 6c. Thereafter, while VH<VB, the reactor current IL increases even if the switching element 6c is in the OFF state. That is, due to the effect of LC resonance, the amplitude in the positive direction of the reactor current IL increases more than the amplitude at time t1.

Thereafter, at time t5, when the capacitor voltage VH becomes smaller than the battery voltage VB, the reactor current IL takes a minimum value and starts to increase again, but the amplitude of the reactor current IL at this time increases in the negative direction from the amplitude at time t2 due to the effect of LC resonance.

Thereafter, by performing the first control at time t6 and the second control at time t7, the amplitude of the reactor current IL may be increased at time t8 in the negative direction more than the amplitude at time t5.

Thereafter, by performing the first control at time t9 and the second control at time t10, the amplitude of the reactor current IL may be further increased in the positive direction. Thus, as a result of alternately repeating the first control and the second control, as indicated by a white double-headed arrow along a current axis, a reactor current IL5 as a large amplitude ripple current is obtained. By allowing this to flow into the battery 5a, it is possible to effectively raise the temperature.

Here, a white double-headed arrow along a time axis indicates an interval T between time t1 and time t4 at which the second control is performed. As may be seen from FIG. 3, an interval between time t4 and time t7 at which the second control is performed next is longer than the interval T, and an interval between time t7 and time t10 at which the second control is performed further next is further longer. The same applies to the intervals at which the first control is performed. Thus, in the exemplary embodiment, in the battery heating mode control, changeover (switching) of the switching element 6b and the switching element 6c is not necessarily performed at constant intervals as in control in the normal voltage converter 6. That is, switching of the switching element 6b and the switching element 6c is performed at the timing when the capacitor voltage VH becomes minimum or the reactor current IL becomes almost zero from a negative value. As a result, it is possible to effectively increase an amplitude of the reactor current IL due to the LC resonance.

Further, since the change of the reactor current IL at this time is a relatively low frequency, the reactor current IL is unlikely to be attenuated by the filter capacitor 6d, and may effectively flows to the battery 5a to raise the temperature.

In particular, in a case where the battery 5a is a lithium ion battery, the battery 5a has a temperature characteristic that input/output characteristics deteriorate when an outside air temperature is low. Therefore, using the heating device according to the exemplary embodiment is suitable.

Figure 4:
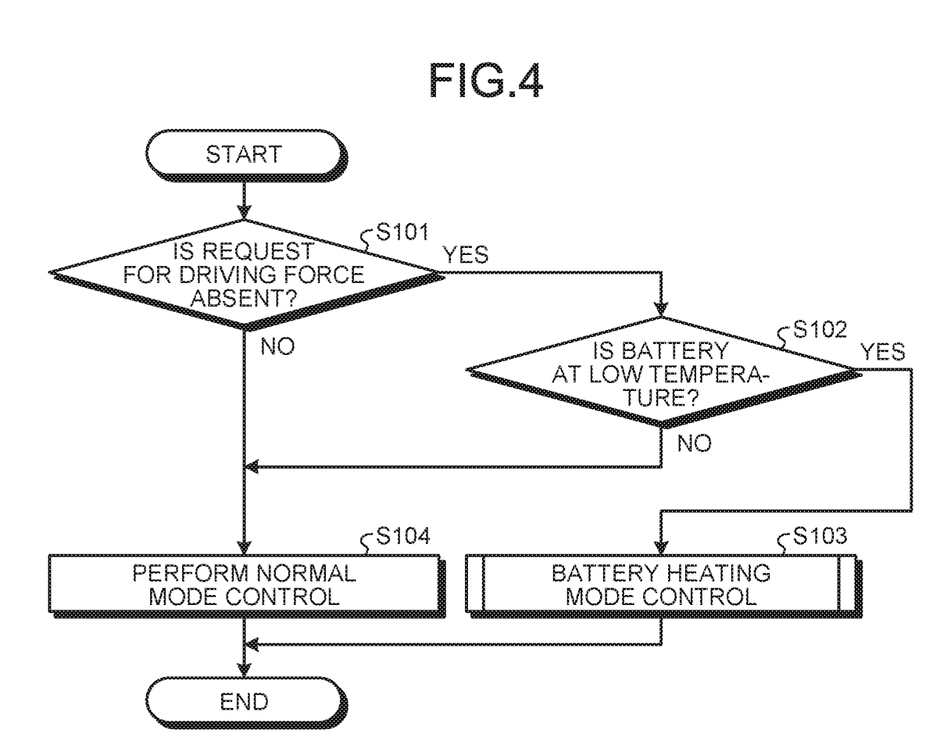
FIG. 4 is a flowchart illustrating an example of control performed by an HV-ECU.

FIG. 4 is a flowchart illustrating an example of control performed by the HV-ECU. This control flow is repeatedly performed, for example, after the main switch of the vehicle 100 is turned ON. In this control flow, in step S101, the HV-ECU 21 determines whether or not there is a request for a driving force. The HV-ECU 21 determines whether or not there is a request for a driving force on the basis of, for example, a signal of the accelerator opening degree. When it is determined that there is no request for a driving force (step S101, Yes), the control proceeds to step S102, and the HV-ECU 21 determines whether the battery 5a is at a low temperature. In this control flow, when the battery temperature TB is equal to or less than a predetermined value, the HV-ECU 21 determines that the battery 5a is at a low temperature. When it is determined that the battery 5a is at a low temperature (step S102, Yes), the control proceeds to step S103, and the HV-ECU 21 executes battery heating mode control, which is a subroutine, and then ends this control. Whereas, when the HV-ECU 21 determines that there is a request for a driving force (step S101, No), and when the HV-ECU 21 determines that the battery 5a is not at a low temperature (step S102, No), the control proceeds to step S104, and the HV-ECU 21 executes a normal mode control and then ends this control. Note that, the normal mode control is that the HV-ECU 21 generates the signal PWM3 so as to cause the switching element 6b and the switching element 6c to function as the voltage converter 6 that performs desired voltage conversion, and outputs the signal PWM3 to the voltage converter 6 to perform control.

Figure 5:
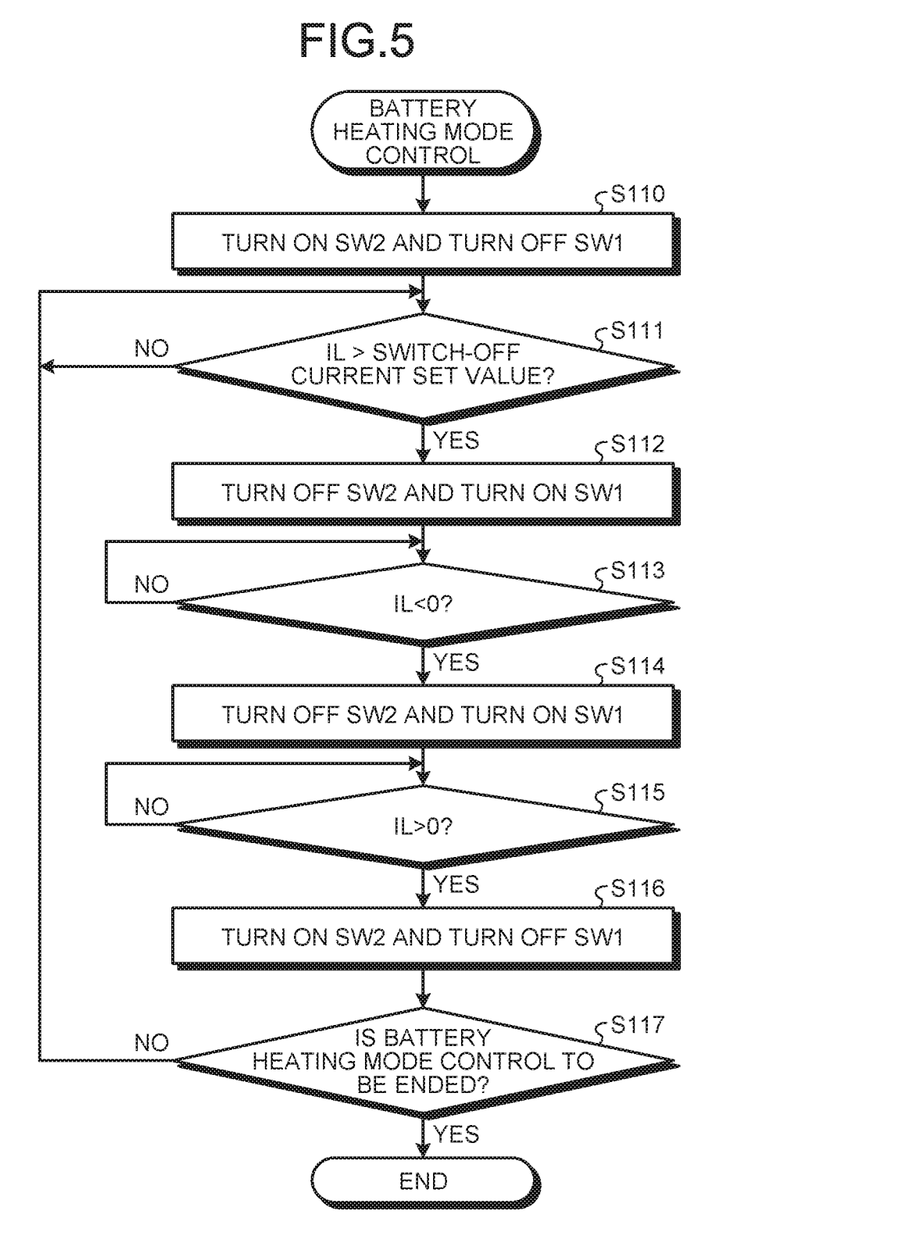
FIG. 5 is a flowchart illustrating an example of a battery heating mode control.

FIG. 5 is a flowchart illustrating an example of the battery heating mode control, which is a subroutine. Hereinafter, the switching element 6b is described as SW1, and the switching element 6c is described as SW2. In this control flow, in step S110, the HV-ECU 21 turns ON SW2 and turns OFF SW1.

Subsequently, in step S111, the HV-ECU 21 determines whether the reactor current IL is larger than the switch-off current set value. When it is determined that the reactor current IL is not larger than the switch-off current set value (step S111, No), step S111 is repeatedly performed. When it is determined that the reactor current IL is larger than the switch-off current set value (step S111, Yes), the control proceeds to step S112.

In step S112, the HV-ECU 21 turns OFF SW2 and turns ON SW1 (the second control).

Subsequently, in step S113, the HV-ECU 21 determines whether the reactor current IL is smaller than zero, that is, a negative value. When it is determined that the reactor current IL is not smaller than zero (step S113, No), step S113 is repeatedly executed. When it is determined that the reactor current IL is smaller than zero (step S113, Yes), the control proceeds to step S114.

In step S114, the HV-ECU 21 individually maintains the OFF state of SW2 and the ON state of SW1.

Subsequently, in step S115, the HV-ECU 21 determines whether the reactor current IL is larger than zero, that is, not a negative value. This determination corresponds to determination as to whether or not the reactor current IL has become substantially zero from a negative value. When it is determined that the reactor current IL is not larger than zero (step S115, No), step S115 is repeatedly executed. When it is determined that the reactor current IL is larger than zero (step S115, Yes), the control proceeds to step S116.

In step S116, the HV-ECU 21 turns ON SW2 and turns OFF SW1 (the first control).

Subsequently, in step S117, the HV-ECU 21 determines whether to end the battery heating mode control. When there is no request for a driving force and the battery temperature TB is equal to or less than a predetermined value, the HV-ECU 21 determines not to end the battery heating mode control (step S117, No), and the control returns to step S111.

When there is a request for a driving force or the battery temperature TB is higher than the predetermined value, the HV-ECU 21 determines to end the battery heating mode control (step S117, Yes), and the control returns.

Figure 6A:
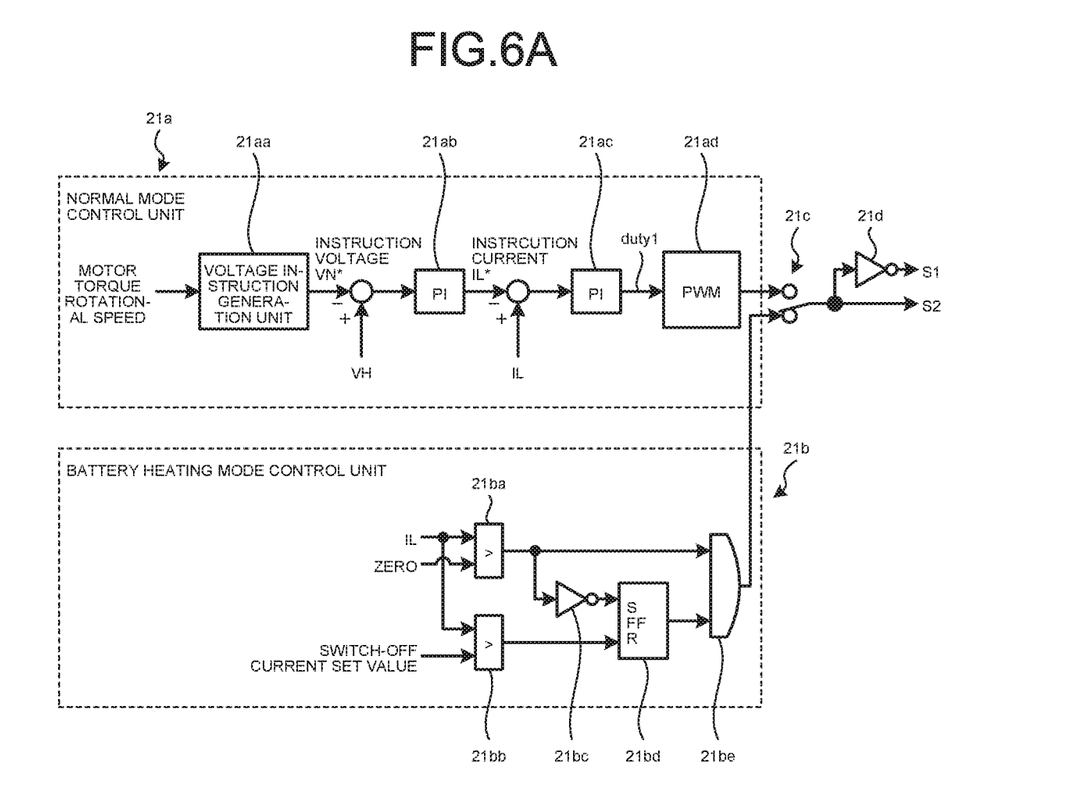
FIGS. 6A and 6B are a block diagram corresponding to the flowchart of FIG. 5 and a view illustrating a graph of an AND circuit input signal with respect to a reactor current.

FIG. 6A is diagram illustrating a block diagram corresponding to the flowchart of FIG. 5. As illustrated in FIG. 6A, the HV-ECU 21 has a normal mode control unit 21a, a battery heating mode control unit 21b, a switching unit 22c, and a NOT circuit 22d.

The normal mode control unit 21a outputs the signal S2, which is for when performing the normal mode control. The battery heating mode control unit 21b outputs the signal S2, which is for when performing the battery heating mode control. When it is determined that the battery 5a is at a low temperature, the switching unit 22c outputs the signal S2 from the battery heating mode control unit 21b, and when it is determined that the battery 5a is not at a low temperature, the output is switched so as to output the signal S2 from the normal mode control unit 21a. When the signal S2 is inputted from the switching unit 22c, the NOT circuit 22d inverts the signal S2 and outputs the signal S1. The signals S1 and S2 form the signal PWM3 and are outputted to the voltage converter 6.

The normal mode control unit 21a includes a voltage instruction generation unit 21aa, a proportional integral (PI) operation units 21ab and 21ac, and a PWM operation unit 21ad.

In the normal mode control unit 21a, the voltage instruction generation unit 21aa is inputted with a motor torque and a motor rotational speed required for the motor generator MG2 and calculated from a vehicle speed and an accelerator opening degree, and outputs an instruction voltage VH* for an output voltage (corresponding to the capacitor voltage VH) of the voltage converter 6. The PI operation unit 21ab is inputted with a difference between VH* and a measured current capacitor voltage VH, and outputs an instruction current IL* for the reactor current. The PI operation unit 21ac is inputted with a difference between IL* and a measured current reactor current IL, and outputs an instruction signal duty1 of a duty ratio for the signal PWM3. The PWM operation unit 21ad is inputted with the instruction signal duty1, and outputs the signal S2, which is a PWM signal.

The battery heating mode control unit 21b includes comparators 21ba and 21bb, a NOT circuit 22bc, a flip-flop circuit 21bd, and an AND circuit 21be.

In the battery heating mode control unit 21b, the comparator 21ba outputs a comparison result of the reactor current IL and a zero value. The comparator 21bb outputs a comparison result of the reactor current IL and a switch-off current set value. The NOT circuit 22bc is inputted with an output of the comparator 21ba, and inverts and outputs this output. In the flip-flop circuit 21bd, the output of the NOT circuit 22bc is inputted to a set (S) side, and the output of the comparator 21bb is inputted to a reset (R) side. The AND circuit 21be is inputted with the output of the comparator 21ba and the output of the flip-flop circuit 21bd, and outputs the signal S2.

Figure 6B:
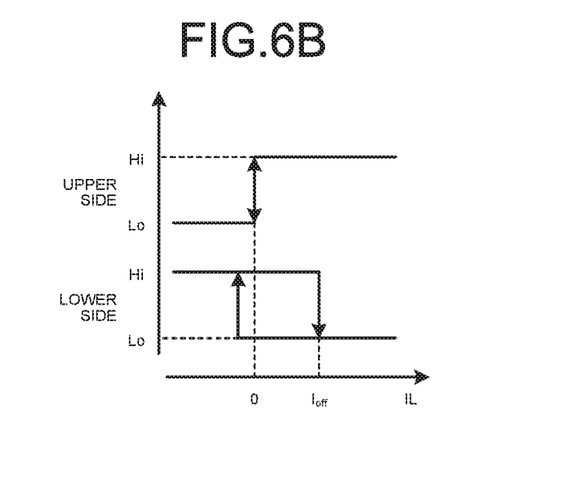

FIG. 6B illustrates a graph of an AND circuit input signal with respect to the reactor current IL. In FIG. 6B, an upper side illustrates an input signal from the comparator 21ba to the AND circuit 21be, and a lower side illustrates an input signal from the flip-flop circuit 21bd to the AND circuit 21be. On the upper side, the output signal from the comparator 21ba is a Lo signal when the reactor current IL is a negative value, becomes a Hi signal when the reactor current IL increases from zero to a positive value, and becomes a Lo signal when the reactor current IL decreases from a positive value to a negative value. Whereas, on the lower side, an output signal from the flip-flop circuit 21bd is a Hi signal when the reactor current IL is a negative value, holds the Hi signal even if the reactor current IL increases from zero to a positive value, and is reset and becomes a Lo signal when the reactor current IL becomes larger than the switch-off current set value $I_{off}$. Thereafter, even if the reactor current IL becomes equal to or less than the switch-off current set value $I_{off}$, the Lo signal is held, but is to be set and become a Hi signal after a predetermined delay, when the reactor current IL becomes a negative value. Note that a value of the switch-off current set value $I_{off}$ is set, for example, in accordance with a withstand voltage of the voltage converter 6.

As described above, according to the heating device of the exemplary embodiment, since an amplitude of the ripple current may be increased, a temperature of the battery may be effectively raised. As a result, even at a low temperature where the output of the battery decreases, the temperature of the battery may be quickly raised to a level to enable traveling. Further, an additional heater is not necessarily provided to raise the temperature of the battery.

Meanwhile, in the exemplary embodiment, it is determined in step S113 of FIG. 5 whether or not the reactor current IL is smaller than zero in the battery heating mode control. Here, as illustrated in FIG. 3, when the reactor current IL becomes smaller than zero, a gradient of the capacitor voltage VH becomes a negative value. Therefore, the determination as to whether the reactor current IL is smaller than zero is equivalent to determination as to whether the gradient of the capacitor voltage VH is a negative value. Therefore, it may be determined whether the gradient of the capacitor voltage VH is a negative value. Further, in step S115 of FIG. 5, it is determined whether the reactor current IL is larger than zero. Here, as illustrated in FIG. 3, when the reactor current IL becomes larger than zero, the gradient of the capacitor voltage VH becomes equal to or larger than zero. Therefore, the determination as to whether the reactor current IL is larger than zero is equivalent to determination as to whether the gradient of the capacitor voltage VH is equal to or larger than zero. Therefore, it may be determined whether the gradient of the capacitor voltage VH is equal to or larger than zero.

Further, in the exemplary embodiment, the condition on the parameter related to the temperature of the battery 5a is the condition that the battery temperature TB detected by the temperature sensor 15 is equal to or less than a predetermined value. However, the condition on the parameter related to the temperature of the battery 5a is not limited to this.

For example, the condition for the parameter related to the temperature of the battery 5a may be a condition that the outside air temperature is equal to or less than a predetermined value. The HV-ECU 21 may acquire the outside air temperature from an outside air temperature sensor (not illustrated). In addition, in a case where an on-vehicle electronic information communication device such as a car navigation system may acquire a forecast value of the outside air temperature by communication, the HV-ECU 21 may acquire and use the predicted value as the value of the outside air temperature. Further, the condition on the parameter related to the temperature of the battery 5a may be a condition that a date or time is within a predetermined range. When the date corresponds to a season with a low outside air temperature, or when the time corresponds to a time zone with a low outside air temperature, since it is predicted or estimated that the battery 5a is at a low temperature to such an extent that the temperature rise is desirable, the battery heating mode control execution condition may be established. The HV-ECU 21 may acquire the date and time from an on-vehicle electronic information communication device such as a car navigation system, or the HV-ECU 21 itself may have a clock function. Further, the condition on the parameter related to the temperature of the battery 5a may be a condition that a battery input/output possible range (Win, Wout) is within a predetermined range. The battery input/output possible range is a range of power that may be inputted to and outputted from the battery 5a. For example, as described above, when the battery 5a is a lithium ion battery, input/output characteristics has a temperature characteristic according to the outside air temperature. Therefore, when the battery input/output possible range is the predetermined range, since it is predicted or estimated that the battery 5a is at a low temperature to such an extent that the temperature rise is desirable, the battery heating mode control execution condition may be established. The HV-ECU 21 may acquire the battery input/output possible range from the battery ECU 22, for example, or calculate the battery input/output possible range on the basis of signals of the battery temperature TB and the SOC acquired from the battery ECU 22, and the like.

Further, the present disclosure is not limited by the exemplary embodiment. For example, the load is not limited to the motor generator or the inverter. Moreover, the present disclosure also includes a configuration obtained by appropriately combining each constituent element described above. Further, additional effects and modifications may be easily derived by those skilled in the art. Thus, broader aspects of the present disclosure are not limited to the exemplary embodiment, but various modifications are possible.

According to the exemplary embodiment of the present disclosure, in a state where the first switching unit is in an ON state and the second switching unit is in an OFF state, and a battery voltage is larger than a voltage across the capacitor after the capacitor switches from a charging state to a discharging state, the control unit turns OFF the first switching unit and turns ON the second switching unit when a current value becomes substantially zero from a state where a direction of a reactor current is a direction of flowing from the load side to the battery side. This causes the voltage to become minimum after discharge of the capacitor by the effect of LC resonance between the reactor and the capacitor, and may increase a ripple amplitude of the reactor current thereafter, exhibiting an effect that the temperature of the battery may be effectively raised.

A capacitor voltage, and increase a reactor current may be increased.

A ripple amplitude of a reactor current may be further increased.

The exemplary embodiment allows a structure of the voltage converter that performs voltage conversion between a battery and a load to be utilized for heating.

The exemplary embodiment enables suitable acquisition of a parameter related to a temperature of the battery, and determination of a temperature increase mode control execution condition.

The exemplary embodiment allows determination of the temperature increase mode control execution condition, with the battery temperature as a direct determination criterion.

Although the disclosure has been described with respect to the exemplary embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery heating device comprising:
a capacitor connected in parallel between a battery and a load that is electrical;
a reactor connected to the capacitor, the reactor being connected between the battery and the load, wherein the reactor is located closer to the battery than the capacitor;
a first switch connected to a terminal on the load side of the reactor, and to one terminal of the capacitor;
a second switch connected to a terminal on the load side of the reactor, and to another terminal of the capacitor;
a controller configured to control an ON/OFF state of the first switch and the second switch; and
a current sensor configured to detect a direction and a current value of a reactor current flowing in the reactor, wherein
when the controller determines that a battery heating mode control execution condition is satisfied including a condition on a parameter related to a temperature of the battery, in a state where the first switch is in an ON state and the second switch is in an OFF state, and a voltage of the battery is larger than a voltage across two terminals of the capacitor after the capacitor switches from a charging state to a discharging state, the controller is configured to perform battery heating mode control including a first control of turning OFF the first switch and turning ON the second switch when the current value becomes substantially zero from a state where a direction of the reactor current is a direction of flowing from the load side to the battery side.

2. The battery heating device according to claim 1, wherein
the battery heating mode control includes a second control of turning ON the first switch and turning OFF the second switch when a current value of the reactor current becomes larger than a set value in a state where a direction of the reactor current is a direction of flowing from the battery side to the load side.

3. The battery heating device according to claim 2, wherein the controller is configured to alternately and repeatedly perform the first control and the second control.

4. The battery heating device according to claim 1, wherein the reactor, the first switch, and the second switch form a voltage converter.

5. The battery heating device according to claim 1, further comprising
a sensor configured to acquire a parameter related to a temperature of the battery.

6. The battery heating device according to claim 5, wherein
the sensor is a temperature sensor configured to detect a temperature of the battery, and
a condition on a parameter related to a temperature of the battery is a condition that a temperature detected by the temperature sensor is equal to or less than a predetermined value.

* * * * *